May 17, 1949.  G. E. CARLETON  2,470,471
DUAL CHECK VALVE
Filed Feb. 8, 1944
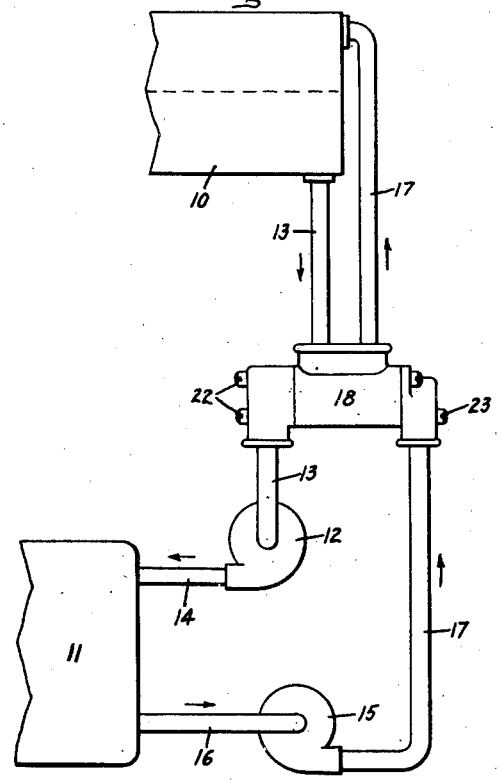
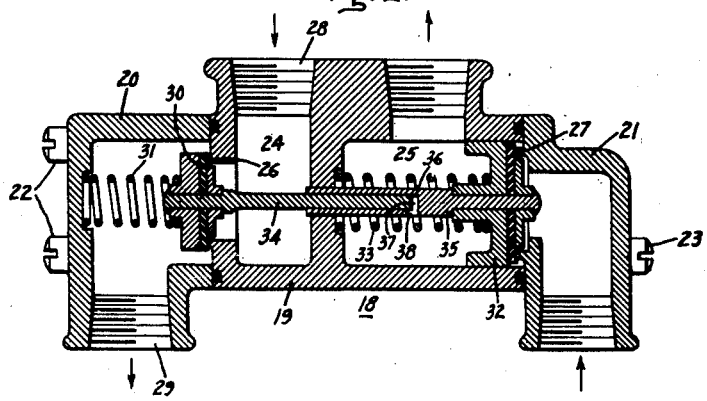
Inventor:
Granville E. Carleton,
by Harry E. Dunham
His Attorney.

Patented May 17, 1949

2,470,471

UNITED STATES PATENT OFFICE 2,470,471

DUAL CHECK VALVE

Granville E. Carleton, Beverly Farms, Mass., assignor to General Electric Company, a corporation of New York Application February 8, 1944, Serial No. 521,543

2 Claims. (Cl. 277—3)

The present invention relates to anti-leak valve arrangements for reducing or preventing leakage of fluid such as lubricating oil from a tank or like container for fluid or lubricant. More specifically, the invention relates to anti-leak valve arrangements for use in systems in which the tank or reservoir for oil is located above a consumer such as bearings or other elements requiring oil under pressure during operation and connected thereto by a conduit including a lubricating pump to force lubricant from the tank to the consumer and another conduit including a scavenging pump for returning lubricant from the consumer to the tank. In arrangements of this kind, especially when used on aircraft, it is important to prevent leakage or flow of lubricant from the tank to the consumer when no lubricant is needed. This has been accomplished heretofore by means of a check valve in the supply line to the lubricating pump. During operation such check valve is opened and kept in open position by the suction of the lubricating pump. On aircraft the suction of the pump decreases with increasing altitude and therefore means have heretofore been suggested, for example an evacuated bellows associated with the check valve or anti-leak valve, to permit the suction of the pump to open the valve at high altitude. An arrangement of this kind is disclosed in Patent 2,312,063 to W. H. Allen et al., issued Feb. 23, 1943, and assigned to the same assignee as the present application.

The object of the present invention is to provide an improved construction of anti-leak valve arrangements and a fluid supply or circulating system including such arrangements whereby leakage of fluid from a container for oil or like liquid is effectively reduced or eliminated when no oil or liquid is needed or upon failure of the lubricating pump.

For a consideration of what I believe to be novel and my invention, attention is directed to the following description and the claims appended thereto in connection with the accompanying drawing.

In the drawing Fig. 1 illustrates a fluid-circulating system embodying an anti-leak valve arrangement according to my invention; and Fig. 2 is a sectional view of the anti-leak valve arrangement of Fig. 1.

The arrangement comprises a tank or reservoir 10 for oil or like fluid and a consumer 11 located below the level of the tank 10 and requiring oil under pressure during operation. Such consumer 11 may be a bearing or a gearing of a turbosupercharger for aircraft. Oil is circulated from the tank 10 through the consumer 11 by means of a circuit comprising a lubricating pump 12 having an inlet conduit 13 connected to the tank 10 and a discharge conduit 14 connected to the consumer 11 and a scavenging pump 15 having an inlet conduit 16 connected to receive lubricant from the consumer 11 and a discharge conduit 17 connected to the tank 10 above the oil level therein. In order to prevent or reduce leakage of oil from the tank 10 to the consumer 11 when the pump 12 is out of operation, as when the aircraft is on ground with engines stopped, an anti-leak valve arrangement 18 is connected into the inlet conduit 13 of the lubricating or supply pump 12 and the discharge or return conduit 17 of the scavenging pump 15.

The valve arrangement 18, as shown in Fig. 2, comprises a casing 19 which has a central portion and two end portions 20 and 21 secured to the central portion by bolts 22 and 23 respectively. The casing forms two separate valve chambers or channels 24 and 25 with valve seats 26 and 27 respectively. The chamber or channel 24 forms a part of the conduit 13 and has an inlet 28 and an outlet 29. Flow of fluid through the chamber 24 is controlled by a check valve having a disk 30 biased against the seat 26 by means of a compression spring 31.

The chamber 25 forms part of the conduit 17. Flow of fluid through the chamber or channel 25 is controlled by a check valve having a disk or piston 32 biased against the seat 27 by a compression spring 33. Both movable valve members or disks 30 and 32 are biased towards the right, that is, in the same direction by their respective springs 31 and 33.

According to my invention the two check valves are mechanically connected whereby opening movement of the valve 32 aids in opening the valve 30. In the present example the valve disk 30 is secured to a stem 34 and the valve disk or piston 32 is secured to another stem 35 which has a bore 36 for receiving and guiding the stem 34. In closed position, as in Fig. 2, the stems 34 and 35 have a small axial clearance 37 in the bore vented by a lateral opening 38 in the stem 35, thus permitting independent and firm engagement between the valves and their respective seats.

During operation the suction of the supply pump 12 reduces the pressure in the end portion 20 of the casing. On ground or at low altitude this reduction in pressure will be sufficient to cause opening of the check valve 30 by the atmospheric pressure and the static pressure of the liquid head on the right-hand side of the valve disk 30. At high altitude, however, the suction of the pump 12 is considerably lower so that the differential pressure created across the valve disk 30 will not suffice to effect opening of the valve disk against the biasing force of the spring 31. In that case the pressure produced by the scavenging pump 15 and acting on the right-hand side of the disk or piston 32 creates a force transmitted to the piston 34 of the valve disk 30 which together with the differential pressure across the valve disk 30 is sufficient to overcome the biasing force of the spring 31.

The aforementioned clearance 37 between the stems 34, 35 constitutes a lost motion between them so that the force of the outlet pressure against the right-hand side of the disk 32 allows slight movement of the latter to the left before any motion is transmitted to the stem 34, which transmission occurs only upon engagement between the right-hand end of the stem 34 and the stem 35. In order that the restriction of oil flow through valve 30 will be as small as possible when the valve is open, it is desirable that the valve disk 30 be as far to the left as possible when the valve is open. To this end the disk 32 is in the form of a piston with sliding clearance in the channel 25, which piston uncovers the outlet port and permits free flow through the conduit 17 only after it has moved a distance equal to the complete opening stroke of the valve 30. A second purpose of the piston 32 with its sliding fit in the channel 25 is to cause opening of the piston 32 by air pressure alone from the scavenger pump, thus effecting opening of the valve 30 even when no oil is passing through the valves and only insufficient suction is available for opening the valve 30. This condition might occur if for any reason the oil flow through the valves was temporarily stopped while an aircraft was flying at a high altitude at which the available atmospheric suction was not sufficient to reopen the valve 30.

Thus, with my invention I have provided an improved anti-leak valve arrangement to prevent the flow of liquid from a tank to a consumer located below the tank when no liquid is needed. Broadly, the arrangement includes separate check valves located in the supply and return conduits between the tank and the consumer and means biasing the valves in the same direction towards their respective seats and other means mechanically connecting the valves whereby opening of one of them causes or aids in opening of the other. The provision of a check valve in the return conduit also prevents reverse flow through the latter in case the oil tank is moved or turned into a relative position in which the return conduit connection to the tank communicates with the body of oil therein as may occur during certain fluid conditions of an aircraft.

Having described the method of operation of my invention, together with the apparatus which I now consider to represent the best embodiment thereof, I desire to have it understood that the apparatus is only illustrative and that the invention may be carried out by other means.

What I claim as new and desire to secure by Letters Patent of the United States is:

1. In a valve arrangement, the combination of a casing defining two separate passages therethrough, each passage including an inlet chamber and an outlet chamber with an opening communicating therebetween and surrounded by a valve seat, said valve seats lying in parallel planes and axially spaced, a first valve disk member adapted to sealingly engage one of said seats, a second valve member comprising a piston adapted to sealingly engage the other seat and slidably arranged in the housing for axial movement relative to the seat, separate spring means adapted to bias the valve disk and piston in the same direction against their respective seats, first and second stem members connected to said disk and piston respectively and arranged in telescopic relation with axial clearance therebetween whereby the piston may move away from its seat before the disk leaves its seat.

2. In a valve arrangement, the combination of a casing defining two separate passages therethrough, said housing defining a valve seat in each passage, said seats lying in parallel planes and axially spaced, a first valve disk member adapted to sealingly engage one of said seats, first spring means biasing said valve disk against the seat, a second valve member comprising a piston adapted to sealingly engage the other seat and slidably arranged in the housing for axial movement relative to the seat, second spring means adapted to bias the piston member in the same direction against its seat, and first and second stem members connected to said disk and piston respectively with a lost motion mechanical connection therebetween whereby the piston may be caused to leave its seat and move a limited distance in the opening direction by a pressure drop thereacross without producing any movement of the valve disk, after which further movement of the piston positively moves the valve disk in the opening direction.

GRANVILLE E. CARLETON.

REFERENCES CITED

The following references are of record in the file of this patent:

UNITED STATES PATENTS

| Number | Name | Date |
|---|---|---|
| 1,855,505 | Wilson | Apr. 26, 1932 |
| 2,110,758 | Daniels | Mar. 8, 1938 |
| 2,263,414 | Beneshek | Nov. 18, 1941 |
| 2,285,686 | Shanley | June 9, 1942 |